(12) United States Patent
Ögren

(10) Patent No.: US 6,453,165 B1
(45) Date of Patent: Sep. 17, 2002

(54) CHANNEL ALLOCATION IN RADIO SYSTEMS

(75) Inventor: Mats Ögren, Stockholm (SE)

(73) Assignee: Televerket, Farsta (SE)

( * ) Notice: Subject to any disclaimer, the term of this patent is extended or adjusted under 35 U.S.C. 154(b) by 0 days.

(21) Appl. No.: 08/478,811

(22) Filed: Jun. 7, 1995

Related U.S. Application Data

(63) Continuation of application No. 08/313,611, filed on Sep. 30, 1994, now abandoned, which is a continuation of application No. 08/030,878, filed on Mar. 12, 1993, now abandoned.

(30) Foreign Application Priority Data

Apr. 8, 1992 (SE) ............................................... 9201111

(51) Int. Cl.$^7$ ................................................. H04B 7/00

(52) U.S. Cl. ......................................... 455/450; 455/63

(58) Field of Search ............................... 455/33.1, 33.2, 455/34.1, 53.1, 54.1, 54.2, 56.1, 62, 63, 422, 426, 450, 451, 452, 453, 67.1, 67.3, 507, 517

(56) References Cited

PUBLICATIONS

Mobile Radio Conference 1991, Nice, France, Nov. 13, 14, 15, 1991 M. Duque Anton et al: "Channel Assignment Using Simulated Annealing", pp. 121–128.

*Primary Examiner*—Thanh Cong Le
(74) *Attorney, Agent, or Firm*—Oblon, Spivak, McClelland, Maier & Neustadt, P.C.

(57) ABSTRACT

A method of allocating radio channels, between the base stations of a multi-base station radio system, uses a mathematical model of the radio system which is derived from an analog of the radio system. The analog is a thermal bath containing a plurality of interacting particles, each particle in a particular spin state. The number of particles at a given location in the thermal bath, corresponding to the traffic demand at an equivalent location in the radio system, each occupied spin state corresponding to a particular radio channel. The model is operated by allowing the spin states to relax, by means of a stochastic reduction in temperature of the thermal bath, from an initial infinite temperature, to a minimum energy, which equates to an acceptable level of interference between radio channels, operated in the different cells of the radio system. The distribution of spin states at the minimum energy determines the allocation of radio channels. Apparatus for implementing the method includes a central control unit which runs the mathematical model and issues commands to the individual base stations allocating channels.

5 Claims, 2 Drawing Sheets

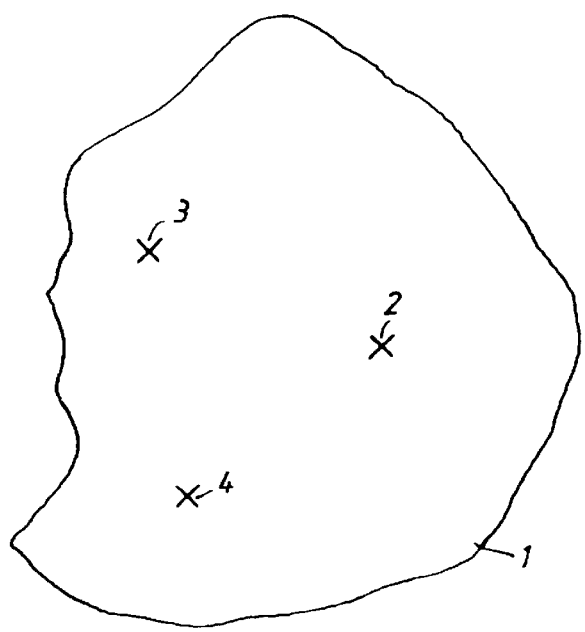
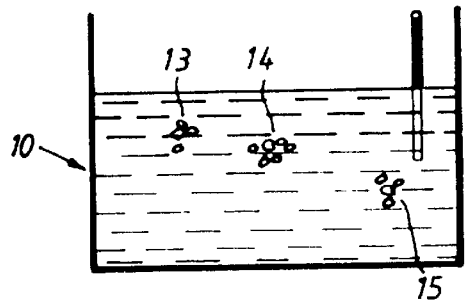
FIG. 1b
FIG. 1a
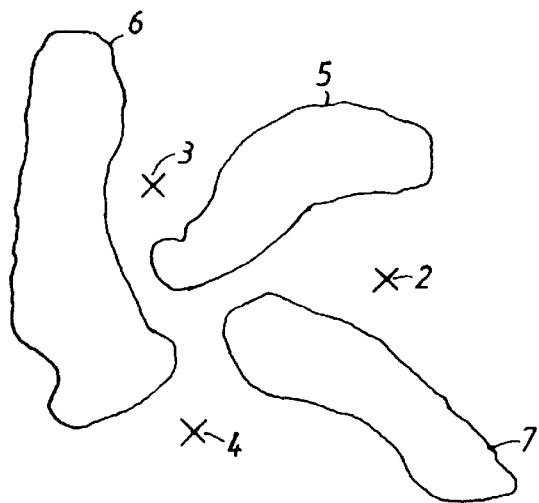
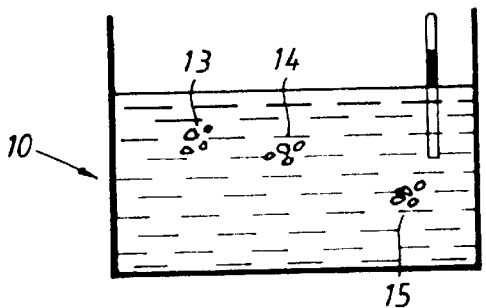
FIG. 2b
FIG. 2a

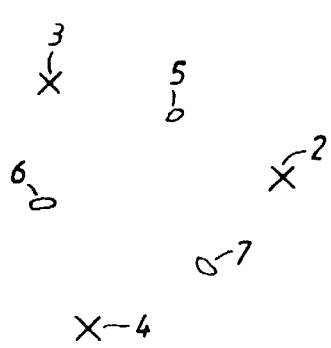
FIG. 3a
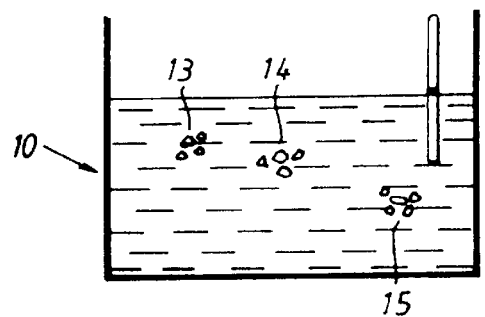
FIG. 3b
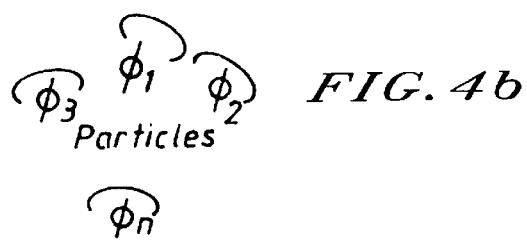
FIG. 4b
FIG. 4a
Radio basestation
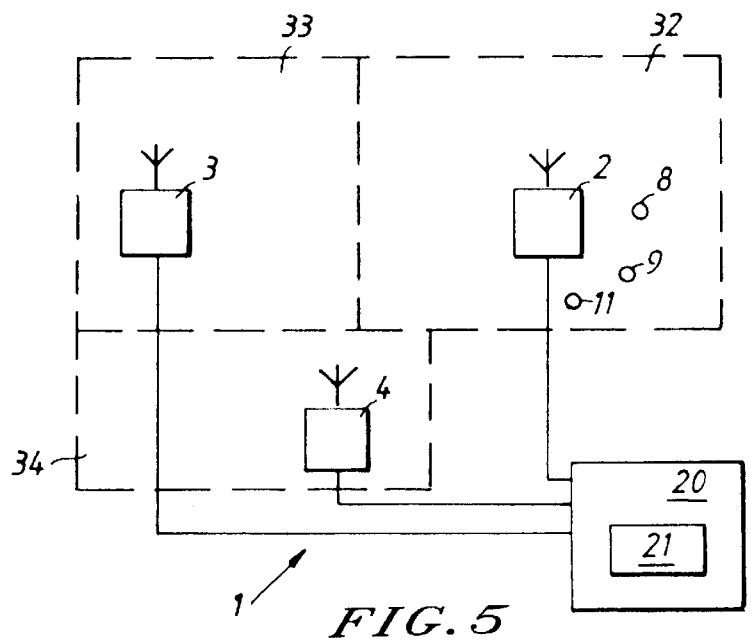
FIG. 5

CHANNEL ALLOCATION IN RADIO SYSTEMS

This application is a Continuation of application Ser. No. 08/313,611, filed on Sep. 30, 1994, now abandoned; which is a continuation of Ser. No. 08/030,878, filed on Mar. 12, 1993, now abandoned.

BACKGROUND TO THE INVENTION

The invention relates to a method of allocating radio channels between the base stations of a radio system, having a plurality of base stations, and apparatus for implementing the method.

In radio systems used for telecommunications, especially, but not exclusively, those available for use by the general public, such as mobile radio telephony systems, traffic demand varies according to the time of day, from day to day, and with the season of the year. This phenomena is a problem with which all those engaged in the arts of operating, installing and designing such systems are familiar. In the first multi-base station radio systems, channel allocation was implemented when the radio systems were initially commissioned. Prior to commissioning measurements relating to field strengths, ranges of coverage, interference characteristics etc. were carried out. Redistribution of radio channels was carried out when new base stations and/or new channels were introduced to the systems. Redistribution of channel allocation was also carried out if it was found that the traffic capacity of the systems was inadequate. The utility of such radio systems remained constant for long periods because changes to channel allocation required a significant amount of work to be performed on the systems.

In multi-base station systems of the type described above it was discovered, as traffic levels increased, that traffic demand was concentrated on certain geographic areas. Furthermore these geographic areas changed with time, so that it became desirable to redistribute available radio channels between base stations.

Initially, channel redistribution was carried out by mapping the traffic demand at different times of day. This information lead to the conclusion that channel distribution should be changed at certain times of the day. However, it was soon found that this solution was too clumsy to be functional. To overcome this problem those engaged in the field of radio communications attempted to set up, in a variety of ways, automatic systems for distributing radio channels, between base stations, in an optimal manner.

For a proper analysis of traffic demand knowledge of the following factors is required:
- the geographic location of base stations;
- frequencies of the available channels;
- the transmitter powers utilised;
- interactions of the channels with each other in different circumstances; etc.

A variety of methods have been used for determining the optimal redistribution of channels between base stations, for example linear programming with a number of subsidiary conditions, reflecting the variables referred to above. However, one difficulty is that the formulation of the problem is particularly complex, and requires a computer aided solution. Computers are indispensable to today's flexible radio systems.

The prior art methods all have the disadvantage that the mathematical models which they employ become unmanageable with increasing numbers of parameters and conditions. The solution to this problem is of comparable difficulty to that of the well known "travelling salesman" problem.

Furthermore it is not feasible, in practice, to carry out field measurements every time the utilisation of radio channels is to be changed.

SUMMARY OF THE INVENTION

The present invention relates to a method of determining the channel allocation for multi-base station radio systems which can be used in cases where, because of the complexity of the problem, the earlier methods cannot be employed. An apparatus for implementing the method is also described. A radio network which incorporates the present invention includes means for collecting information needed to make decisions on channel allocation, together with a central control device which calculates the channel allocation, as between different base stations, and allocates channels accordingly. The calculation of the channel allocation is made by reference to an analogous physical system which behaves in an analogous manner to a multi-base station radio system, namely a heat bath containing interacting particles. One group of particles represents a given allocation of channels to a given base station. By minimising the total energy of the system, the optimal channel allocation between base stations is determined.

According to a first aspect of the present invention there is provided a method of distributing channels between base stations in a multi-base station radio system by constructing a mathematical model from which can be determined a channel distribution which has an acceptable level of inter-channel interference, and assigning channels to the base stations in accordance with the predictions of the mathematical model, wherein the mathematical model is based on a heat bath having a plurality of particles immersed therein, in which each base station of the radio system corresponds to one particle, each radio channel corresponds to a discrete state of said particle, selected channels are represented by different states of a particle so that changes in said distribution of channels are represented by changes in the states of the particles, interference between base station channels are represented by the interaction between the states of different particles, a change in the interference range coverage area ratio (C/I) is represented by a change in the energy of the thermal bath, the number of particles and states in the mathematical model represents the total number of base stations and channels in the radio system which corresponds to that necessary to meet a predetermined traffic demand with the maximum acceptable level of interference between channels, a first condition of the radio system is specified by the number of particles and the interaction between them in the heat bath, a redistribution of the radio channels or a change in the number of channels is represented in the model by a change in the states and interactions of the particles, the channel allocation is established by setting an initial temperature for the heat bath at infinity and then reducing the temperature in steps so that the states of the particles change in accordance with a stochastic process, and the energy of the heat bath is changed in order to achieve an energy content which corresponds to an acceptable interaction between particles and acceptable level of interference between base stations.

According to another aspect of the present invention there is provided, for a multi-base station radio system having a plurality of base stations, each base station having one or more radio channels allocated to it, a method of distributing available radio channels between base stations so as to reduce interference between radio channels allocated to different base stations to an acceptable level wherein a distribution of radio channels between base stations is determined from a mathematical model based on a plurality of particles in a thermal bath, in which particle(s) at a given location in the thermal bath correspond to a given base station, and the particle(s) have a plurality of states, each occupied state corresponding to a radio channel, the occupancy of states determined by a thermal distribution, and the particles having interaction energies corresponding to interference between base stations, a desired allocation of radio channels being determined by setting the initial temperature of the thermal bath at infinity and then reducing the temperature of the thermal bath in steps so that a local minimum energy is attained by a stochastic process in which the interaction between particles corresponds to an acceptable level of interference between base stations and determining the radio channel allocation from the distribution of occupied states of the particle(s).

According to a further aspect of the present invention there is provided in a multi-base station radio system having a plurality of base stations, each base station having one or more radio channels allocated to it, apparatus for distributing available radio channels between base stations so as to reduce interference between radio channels allocated to different base stations to an acceptable level, includes a control means for sending commands to individual base stations determining the radio channels allocated to the base station, which control means is arranged so that it can receive data on traffic demand in the radio system and the availability and utilisation of radio channels, the control means including a computer on which is run a mathematical model of the radio system from which a distribution of radio channels between base stations is determined, the mathematical model based on a plurality of particles in a thermal bath, in which particle(s) at a given location in the thermal bath correspond to a given base station, and the particle(s) have a plurality of states, each occupied state corresponding to a radio channel, the occupancy of states determined by a thermal distribution, and the particles having interaction energies corresponding to interference between base stations, a desired allocation of radio channels being determined by setting the initial temperature of the thermal bath at infinity and then reducing the temperature of the thermal bath in steps so that a local minimum energy is attained by a stochastic process in which the interaction between particles corresponds to an acceptable level of interference between base stations and determining the radio channel allocation from the distribution of occupied states of the particle(s).

According to yet another aspect of the present invention there is provided a multi-base station radio system having a plurality of base stations, each base station having one or more radio channels allocated to it, including apparatus for distributing available radio channels between base stations so as to reduce interference between, radio channels allocated to different base stations to an acceptable level, which apparatus includes a control means for sending commands to individual base stations determining the radio channels allocated to the base station which control means is arranged so that it can receive data on traffic demand in the radio system and the availability and utilisation of radio channels, the control means including a computer on which is run a mathematical model of the radio system from which a distribution of radio channels between base stations is determined, the mathematical model based on a plurality of particles in a thermal bath, in which particle(s) at a given location in the thermal bath correspond to a given base station, and the particle(s) have a plurality of states, each occupied state corresponding to a radio channel, the occupancy of states determined by a thermal distribution, and the particles having interaction energies corresponding to interference between base stations, a desired allocation of radio channels being determined by setting the initial temperature of the thermal bath at infinity and then reducing the temperature of the thermal bath in steps so that a local minimum energy is attained by a stochastic process in which the interaction between particles corresponds to an acceptable level of interference between base stations and determining the radio channel allocation from the distribution of occupied states of the particle(s).

DESCRIPTION OF PREFERRED EMBODIMENTS OF THE INVENTION

Embodiments of the present invention will now be described by way of example with reference to the accompanying drawings in which:

FIGS. 1a and 1b illustrate diagrammatically a mobile radio network with a plurality of base stations whose interference ranges completely overlap, together with analogous heat bath in which particles are immersed respectively.

FIGS. 2a and 2b show a mobile radio network of the same type as that shown in FIG. 1, in which the interference ranges have been reduced to a number of islands, together with an analogous particle containing heat bath, respectively.

FIGS. 3a and 3b show a mobile radio network of the type shown in FIG. 1, in which the interference level is acceptable, together with the analogous particle containing heat bath.

FIGS. 4a and 4b show a base station with channels k1, k2, . . . , kn, together with particle(s) which represents this base station in the associated heat bath.

FIG. 5 shows a schematic representation of a radio system according to the invention.

A radio system 1, (see FIG. 5), consists of a number of radio base stations 2, 3, 4, which communicate with mobile transceivers 8, 9, 11, within cells 32, 33, 34. Each base station 2, 3, 4, is allocated one or more radio channels. The traffic demand varies at different times of the day, and when this occurs there is a need to vary the channel utilisation. It may also be necessary to rearrange the channel allocation when new stations are brought into the system, or stations are taken out of the system.

When traffic demand changes, a command which causes a rearrangement of the channel allocation is initiated from a central control unit 20, in the system. The central control unit includes a computer 21. The traffic demand via each base station 2, 3, 4, is determined together with the restrictions relating to permissable channel selections. Examples of restrictions are:

the channel demand via each base station;
the number of possible channels which can be handled by each base station;
which channels can be adjacent to each other in the same base station; and which channels can be adjacent to channels allocated to neighbouring base stations.

Because a thermal bath 10, containing particles is analogous to a multi-base station radio system 1, each base station 2, 3, 4, with its associated channels and restrictions can be treated theoretically as a group of particles 13, 14, 15, each in a given quantum spin state, in a thermal system. Each particle interacts with the other particles in the system. The quantum spin states of a group of particles, in the thermal system, corresponds to a given base station with its allocated radio channels, illustrated diagrammatically in FIG. 4. A given particle spin state in the thermal bath analog corresponds to a given channel in the radio system. The traffic demand in a given cell of the radio system corresponds to the number of particles at the corresponding location in the thermal bath analog. The different restrictions on channel allocation can be given a weighting, depending on their significance, for controlling the system's traffic capacity and usability. Such restrictions can be given effect in the model through exclusion principles on occupancy of certain states and probabilities of occupancy of certain states.

Variations on this model can easily be envisaged, for example, vibration states of particles could be used instead of spin states of particles. Furthermore a base station could be represented by a single particle having a plurality of spin states a number of which can be simultaneously occupied c.f. an atom with multiple electronic spin states. The key element of the model is that the individual particle(s) representing base stations must have a series of discrete states which can be thermally excited and are capable of interacting with the states in other particles.

A variety of techniques are available for mathematically modelling a collection of interacting particles, having different spin states, in a thermal bath and the reader is referred to the following text books for details of the available techniques:

C. Kittel, "Thermal Physics", pub. John Wiley & Sons Inc. 1969;

P. G. Moel, S. C. Port and C. J. Stone, "Introduction to Stochastic Processes", pub. Moughton Mifflin Company, 1972;

S. Brunak and B. Lantrup, "Neural Networks", pub. World Scientific, 1990; and

E. Aarts and J. Korst, "Simulated Annealing and Boltzmann Machines", pub. John Wiley & Sons Inc., 1989

Whatever technique is used to model the analogue system, the thermal model is initially given an infinite, or very high, initial temperature, see FIG. 1. In this state the interference ranges of the corresponding mobile radio system overlap completely, and in the analogue thermal bath the particles interact strongly. Thereafter, lower temperatures are simulated. Initially islands of interference 5, 6, 7, are formed, see FIG. 2b. Eventually the temperature is reduced to the point at which the islands of interference 5, 6, 7, have contracted to an acceptable level, see FIG. 3b. In this calculation, interference ranges in the radio system correspond to energies. As this process of progressively lowering the temperature is continued, a minimisation of the total system energy is sought. The minimum energy thus found corresponds to the channel distribution which produces the best utilisation of the system for a given traffic demand. The object is to arrive at the lowest local system energy which permits a given, minimum, degree of particle interaction, by allowing the different distributions of states for the different particles to vary with temperature.

In the model, the restrictions are determined from measured or model-calculated values as the ratio between connection level and interference level (C/I) for each cell, cell pair and channel spacing. Interferences are obtained both from base stations 2, 3, 4, and mobiles 8, 9, 10, in the reception areas (cells) 32, 33, 34. In many cases, it is adequate to consider co-channel and adjacent channel interferences. By co-channel interference is meant interference between the same channel used in different cells. Adjacent channel interference is interference between neighbouring channels operated in different cells. If the (C/I) ratio is lower than a minimum acceptable value, this excludes the use of channels, within the relevant channel spacing, from this cell, if the channel is utilised in a second adjacent cell. The limit value is determined by the probability that interference will occur. In some cases it is desirable to minimise the total interference level. In such cases exclusions are introduced which correspond to a higher value of C/I, or lower interference probability, but with a lower weight, so that all necessary exclusions must still be fulfilled. In this case the value of the weights must be calculated by means of testing. To directly translate C/I and interference probabilities into weights, the optimisation function (the energy) which makes up the sum of all weights corresponding to exclusions which have not been fulfilled, must be changed. Exclusions can also be obtained with respect to the system as a whole. The need for field measurements can be significantly reduced by estimating the co-channel exclusions from adjacent channel exclusions.

The problem thus formulated can be thought of as a set of thermal equations with associated restrictions which must be minimised. In the calculations, it is assumed that the thermal process follows a stochastic process, for example a Markov process. New conditions in the system are simulated by dropping the temperature in the analogue thermal system, see FIGS. 1b to 3b. In particular FIG. 2a shows a radio network 1, in which the interference ranges are reduced to a number of islands 5, 6, 7. The interference level is still not acceptable and so in the thermal analogue the temperature must be lowered still further. FIG. 3a shows a radio network in which the interference levels are acceptable. In the thermal analogue of FIG. 3b the temperature has been lowered to the point at which an acceptable interaction exists between the particles. This implies that the radio system as a whole is functioning in an acceptable manner. The temperature is dropped by lowering the energy content in the system. It is important in this context that sub-optimisation is avoided, since this involves local minima being utilised in the final solution without achieving the best solution for the system. This can be avoided by reducing the temperature in energy steps which correspond to approximately one standard deviation, of the energy distribution between particles present in the thermal bath. Selected temperatures are extrapolated from a curve which is adapted to the mean energies.

The established restrictions may be exceeded during the course of the calculations, which leads to infringement of the stipulated rules for the operation of the radio system. Every time a change of energy is introduced, there either is or is not an infringement of the established restrictions. If there is no infringement, the result is accepted. When an infringement of the established rules is observed, this implies that an energy addition is obtained in the system, which in turn implies that the risk of interference between base stations and/or radio channels is increased. Depending on the importance of the deviation, the different infringements are weighted which enables a better control over the end result. The weightings used in the system can also be changed, for example at different times of the day.

A number of iterations are made up to an empirical factor multiplied by a nominal relaxation time which comprises the ratio between the variance of the energy and the variance of the energy changes. To determine the variance of the energy changes, extrapolation is used. This does not prevent the use of other known methods for calculating the value.

A temperature increase may sometimes be required in difficult cases when the energy is near optimum. Under such circumstances, it may even be necessary, occasionally, to concentrate the calculations on small, but especially troublesome, subregions, where, normally, standard methods suffice for channel allocation. It is also possible to allow the temperature to vary somewhat over the system depending on, among other things, weightings.

The following points should be noted about the thermal bath analog and its relationship to the radio system which it simulates:

- The particles in the thermal bath are arranged in groups at locations corresponding to the base stations in the radio system;
- Each particle has a discrete or quantum spin state corresponding to a given channel in the radio system;
- The number of states corresponds to the number of channels, however the energy of a particular state at a particular location is determined by the interaction with other spins (i.e. interference) rather than by any external field. However an external field, such as a magnetic field could be introduced if, for some reason, certain channels are preferred to others;
- The particles in the thermal bath are in "quasi-equilibrium" with each other, that is to say they are in equilibrium in a state space which contracts as the bath is cooled, excluded states simply become too improbable to occur;
- Interference between channels corresponds to interactions between the spin states, and contributes to the overall heat capacity of the bath;
- The traffic demand in a cell corresponds to the desired number of particles at the corresponding location in the thermal bath. Usually the number of particles at a given location is kept constant during each simulation, although there is no overriding requirement for the number of particles at each location to be kept constant;
- The transmitter power of a given base station is one of the parameters which determine the strength of interaction between locations;
- The C/I ratio corresponds to the heat capacity of the system and relates to the system energy through the heat capacity, the temperature is the controlling parameter and is frequently kept uniform across the whole system;
- As more channels are added to a base station, this can be regarded as the creation of more states, or as an increased occupancy of the existing states.

System constraints on the radio system can be given effect in the model through the use of exclusion principles, for example preventing multiple occupancy of the same state at a given location (equivalent to a base station being unable to make multiple use of the same channel), and by means of prohibited states at certain locations.

In normal use the number of channels allocated to each base station is fixed, the model determines not the number of channels allocated to a given base station, but which channels are allocated to a given base station. It is however possible to vary the number of channels allocated to a base station if this is really necessary, this corresponds to changing the number of particles at a particular location in the thermal bath.

As the temperature of the thermal bath is reduced the spin states of the individual particles will rearrange themselves to produce a lower energy configuration. This takes into account the interaction energies between the particles, which make a contribution to the heat capacity of the system. Eventually a temperature will be reached which corresponds to a local minimum which, hopefully, gives acceptable interference levels. Because of the presence of multiple local energy minima, the final minimum achieved is not necessarily the global minimum. If the interference level is not satisfactory it may be necessary to raise the temperature of the thermal bath in order to hunt for a new local minimum.

The final allocation of channels is read from the model by determining the spin states of the particles at each location.

EXAMPLE

It is by no means easy to visualise just how the analogy between a multi-base station radio system and a thermal bath containing particles operates in practice. A rather simple and trivial example can be constructed, and is presented here, not as an example of an actual system, but as an illustration of how the mathematical model used in the invention can be constructed.

Consider a radio system with three base stations A, B, C and two available channels 1, 2.

From field strengths and/or model computations, the interaction strengths for adjacent channel interference are determined to be:

A-B:0.4
B-C:0.3
A-C:0.1

From field strengths and/or model computations, the interaction strengths for co-channel interference are determined to be:

A-B:1.0
B-C:1.0
A-C:0.5

The traffic demand i.e. the number of channels is:

A:2
B:1
C:1

Site A is represented by a vector $V_a=[a_1, a_2]$, where $a_i=0$ or $a_i=1$, $a_1+a_2=2$ (the traffic demand). Sites B and C are similarly represented.

The energy of the system is thus $$E=\{1.0*(a_1*b_1+a_2*b_2)+1.0*(b_1*c_1+b_2*c_2)+0.5*(a_1*c_1+a_2*c_2)+ \\ 0.4*(a_1*b_2+a_2*b_1)+0.3*(b_1*c_2+b_2*c_1)+0.1*(a_1*b_2+a_2*b_1)\}$$

The vectors $V_a$, $V_b$, and $V_c$ are initialised in a random fashion, i.e. $V_a=[1,1]$, $V_b=[0,1]$, $V_c=[1,0]$. (There is only one possibility for $V_a$ in this example, but we will ignore this).

The state transitions are generated via a Markov chain, so that the probability for a state E is given by a thermal distribution, which is usually the Boltzmann distribution P exp (−E/T) where T is the temperature. The temperature is high (actually infinite) at the beginning and then gradually lowered. Finally the system will settle into a local energy minimum which, in general, is close to a global minimum, thus minimizing interference.

The method of the present invention has the advantage over prior art methods of enabling much more complex forms of the problem of channel allocation to be solved.

The results obtained from the calculations are then used for an automatic redistribution of channels in a radio system.

This redistribution is effected by a central control unit, which allocates the available channels in the best manner at a given time based upon the results of the thermal model with local energy being used to calculate the minimized interference possible.

A physical correlation between the multi-base station radio allocation system and the heat bath can be performed by an apparatus which allocates radio channels to a given base station through a control means for affecting the redistribution of channels between the base station and the control means based on data on traffic demand in the entire radio system and the availability of utilization of radio channels. This control section uses the mathematical model mentioned above with respect to the thermal bath and the channel distribution between a base station which has an acceptable level of inner-channel interference is used to assign given radio frequency channels to a given base station in accordance with the specific predictions that occur based upon the physical heat bath or a mathematical model thereof. This model uses the analogy of each base station of the radio system corresponding to one particle and each radio channel corresponding to a discrete state of the particle. Selected channels are represented by different states of the particle so the changes in the distribution of channels are represented by changes in the state of the particles. An interference can be determined between base stations by the representation of the interaction between states of different particles. A change in the interference range coverage area ratio (C/I) may be modeled by a change in the energy of the entire thermal bath with a number of particles and states in the mathematical model or the actual thermal bath representing the total number of base stations and channels in the radio system which corresponds to that necessary to meet a predetermined traffic demand with maximum acceptable levels of interference between channels. It should be noted that if a physical thermal bath is used the initial temperature is set very high so as to model an "infinite" temperature. An actual "infinite" temperature would of course be physically impossible. However, for the purposes of modeling a very high temperature that far exceeds the normal level is used as the "step down" methodology of Applicant's invention allows for this variance.

I claim:

1. A method of distributing channels between base stations and a multi-base section radio system by analogy with a mathematical model wherein said analogy determines a channel distribution which has an acceptable level of interchannel interference wherein said mathematical model is based on a heat bath having a plurality of particles immersed therein, said method comprising the steps of:

assigning each base station of the radio system as a corresponding one particle of said plurality of particles of said mathematical model wherein each of said radio stations corresponds to a discrete state of each of said particles;

assigning selected channels so they are represented by different states of a particles so that changes in said distribution of channels are represented respectively by changes in the states of said particles;

representing interference between base station channels by an interaction between said states of different particles of said plurality of particles;

representing a change in an interference range coverage area ratio (C/I) by a change in energy of said mathematical model of said heat bath;

representing the total number of base stations and channels in said radio systems by the number of particles and states in said mathematical model wherein said number of particles and states correspond to those number of particles and states necessary to meet a predetermined traffic demand with a maximum acceptable level of interference between channels;

wherein a first condition of said radio system is specified by the number of said plurality of particles and interaction between said number of particles and said heat bath and further wherein one of a redistribution of said radio channels and a change in number of channels is represented in said mathematical model by a change in said states and said interactions of said particles;

setting an initial temperature for said heat bath of said mathematical model and reducing said temperature in a series of steps so that the states of the particles change in accordance with a stochastic process in order to establish channel allocation; and changing energy of said heat bath in order to achieve an energy content which corresponds to an acceptable interaction between said plurality of particles and an acceptable level of interference between said base stations.

2. A method as claimed in claim 1 wherein the temperature of the heat bath is reduced in steps which are selected with respect to the mean temperature.

3. A method as claimed in claim 1 further comprising the step of reducing the temperature of the heat bath in energy steps which correspond to one or any standard deviation of the energy distribution from the mean energy in order to avoid sub-optimization.

4. A method according to claim 1 further comprising the steps of:

selecting temperature reductions with respect to the mean energy according to a prediction method.

5. A method according to claim 1 further comprising the steps of:

reducing the temperature of the heat bath in energy steps which correspond to one standard deviation of the energy distribution from the mean energy in order to avoid sub-optimization; and automatically selecting a number of iterations so that improved convergence is obtained at low energies.

* * * * *